(12) United States Patent
Perichon et al.

(10) Patent No.: US 9,669,864 B2
(45) Date of Patent: Jun. 6, 2017

(54) FRICTION BRAKE MECHANISM AND ASSOCIATED STEERING COLUMN

(71) Applicant: Robert Bosch Automotive Steering Vendôme SAS, Vendome (FR)

(72) Inventors: Olivier Bernard Perichon, Independence, KY (US); Pritish S. Khale, Louisville, KY (US); Michael McFarland, Maineville, OH (US)

(73) Assignee: Robert Bosch Automotive Steering Vendôme SAS, Vendome (FR)

( * ) Notice: Subject to any disclaimer, the term of this patent is extended or adjusted under 35 U.S.C. 154(b) by 240 days.

(21) Appl. No.: 14/149,309

(22) Filed: Jan. 7, 2014

(65) Prior Publication Data

US 2015/0191198 A1   Jul. 9, 2015

(51) Int. Cl.
| | | |
|---|---|---|
| *B62D 1/184* | (2006.01) | |
| *G05G 5/16* | (2006.01) | |
| *G05G 5/12* | (2006.01) | |
| *B62D 5/00* | (2006.01) | |
| *G05G 5/06* | (2006.01) | |
| *G05G 5/08* | (2006.01) | |
| *G05G 5/24* | (2006.01) | |
| *B62D 1/28* | (2006.01) | |

(52) U.S. Cl.
CPC ............ *B62D 5/003* (2013.01); *B62D 1/184* (2013.01); *B62D 1/286* (2013.01); *G05G 5/06* (2013.01); *G05G 5/08* (2013.01); *G05G 5/12* (2013.01); *G05G 5/16* (2013.01); *G05G 5/24* (2013.01); *G05G 2700/24* (2013.01); *Y10T 29/49826* (2015.01)

(58) Field of Classification Search
CPC ...... G15D 1/0259; G05D 1/0246; B62D 6/00; B62D 1/184; G05G 5/06; G05G 5/08; G05G 5/28; G05G 5/12; G05G 5/16; G05G 2700/24
See application file for complete search history.

(56) References Cited

U.S. PATENT DOCUMENTS

| | | | | |
|---|---|---|---|---|
| 2,021,706 A | * | 11/1935 | Wickliffe | B62D 5/0439 180/443 |
| 2,340,356 A | * | 2/1944 | Yanchenko | B60Q 1/425 200/61.35 |
| 2,523,772 A | * | 9/1950 | McGibbon | F16D 27/025 192/35 |
| 2,598,142 A | * | 5/1952 | Smith | B60Q 1/0082 188/161 |
| 2,738,202 A | * | 3/1956 | Burnett | B62D 7/22 280/89.12 |
| 5,289,893 A | * | 3/1994 | Yamamoto | B62D 6/00 180/421 |

(Continued)

*Primary Examiner* — Joseph Rocca
*Assistant Examiner* — Daniel Yeagley
(74) *Attorney, Agent, or Firm* — Haug Partners LLP (57) ABSTRACT

In order to provide a fail-safe operating mode during a transition between an autonomous steering mode and a driver-controlled steering mode in an emergency situation, a steering system comprises a steering shaft, a brake mechanism movable between an released position and a engaged position for angularly locking the steering shaft, and an override such that a non-destructive external torque applied to the steering shaft above a given threshold when the brake mechanism is in the engaged position results in a rotation of the steering shaft.

12 Claims, 5 Drawing Sheets

(56) References Cited

U.S. PATENT DOCUMENTS

| | | | |
|---|---|---|---|
| 5,835,870 A * | 11/1998 | Kagawa | B62D 6/00 180/421 |
| 6,580,989 B1 | 6/2003 | Husain et al. | |
| 7,469,615 B2 * | 12/2008 | Finkbeiner | B62D 1/195 280/775 |
| 2008/0141814 A1 * | 6/2008 | Markfort | B62D 5/008 74/492 |
| 2013/0002416 A1 | 1/2013 | Gazit | |
| 2014/0277893 A1 * | 9/2014 | Rosol | B60W 10/20 701/23 |
| 2016/0009311 A1 * | 1/2016 | Khale | B62D 1/184 74/530 |

\* cited by examiner

FRICTION BRAKE MECHANISM AND ASSOCIATED STEERING COLUMN

TECHNICAL FIELD OF THE INVENTION

The invention relates to a steering system that provides a fail-safe operating mode during a transition between an autonomous steering mode and a driver-controlled steering mode, in particular in an emergency situation.

BACKGROUND ART

To address the issue of an ergonomic and intuitive voluntary transition from an autonomous steering mode to manual steering, it has been suggested in US 2013 002416 to provide a vehicle steering system with an autonomous interface steering wheel movable from a first position to a second position and an autonomous driving electronic control unit configured to receive a signal indicating that the autonomous interface steering wheel has been moved from the first position to the second position and initiate change of operation of the vehicle between the manual steering mode and the autonomous steering mode in response to receiving the signal. However, this system does not address the issue of a safe transition from the autonomous steering mode to the manual or driver-controlled steering mode at the initiative of the autonomous driving electronic control unit, e.g. in an emergency situation.

In a somewhat different context, U.S. Pat. No. 6,580,989 discloses a so-called hybrid-type steering system selectively operable in one of three modes: steer-by-wire, electronic power assist steering (EPAS), and manual steering. The steer-by-wire system includes a driver interface system (DIS), a road wheel actuator system (RWAS), and a controller for monitoring and implementing a preferred control strategy. The steering system operates normally in a steer-by-wire mode. Operation in the alternate EPAS mode and manual mode is determined by a controller in response to a malfunction in any part of either the DIS or the RWAS. In each of the EPAS mode and manual mode, the controller causes a clutch mechanism to engage, thus creating a mechanical linkage between the steerable member and the rack and pinion system. In the EPAS mode, one of the road wheel actuator or the reaction torque generator is available to assist in the steering operation. Alternatively, in the manual mode, both the DIS and the RWAS are deactivated and the vehicle is steerable through entirely mechanical means. As the driver is required to hold the steering wheel in all three operating modes, no particular measures have to be taken in the transition between the different steering modes.

Accordingly, there is a need for means to ensure a safe transition from an autonomous steering to a driver-controlled steering in a vehicle when the driver is unaware of the imminence of this transition.

SUMMARY OF THE INVENTION

According to one aspect of the invention, there is provided a steering system comprising a steering shaft and a brake mechanism movable between a released position and an engaged position for angularly locking the steering shaft, wherein the brake mechanism comprises an override such that a non-destructive external torque applied to the steering shaft above a given threshold when the brake mechanism is in the engaged position results in a rotation of the steering shaft. During a transition from an autonomous steering mode to a driver-controlled steering mode, the brake mechanism can be moved to the engaged position for angularly locking the steering shaft mechanically linked to the ground wheels while the driver regains control of the steering wheel. Once the hands of the driver are on the steering wheel, the vehicle can be steered by applying on the steering wheel a torque above the threshold of the override.

According to a preferred embodiment, the override comprises a first friction element and a second friction element frictionally engaged with one another in the engaged position. The torque threshold for overriding the brake mechanism is given by the pressure between the first and second friction elements. According to one embodiment, the first friction element is non-rotatable relative to the steering shaft, at least in the engaged position. The second friction element is non-rotatable relative to the brake mechanism in the engaged position. The second friction element may be rotatable relative to the brake mechanism in the released position and locked to the brake mechanism (and hence to a dashboard of the vehicle) to engage the brake.

According to a preferred embodiment, a biasing mechanism is provided for engaging with one another the first and second friction elements. The biasing mechanism preferably comprises at least one biasing spring for applying a predetermined biasing force to at least one of the first and second friction elements. The predetermined biasing force is preferably such that the first and second friction elements start slipping upon application of a torque at least equal to the torque threshold. The torque threshold is preferably more than 1 Nm and less than 13 Nm. An adjustable abutment fixed at an adjustable position in relation to the steering shaft can be provided for loading the biasing spring. A particularly compact mechanism can be achieved if the biasing spring is a helicoidal spring wound around the steering shaft.

As will be readily understood, the system can be tuned in various manners before it is mounted on the vehicle to define a desired torque threshold for the override: the material of the friction elements can be changed. If a biasing spring is provided, the stiffness of the spring can be changed. The easiest way of adapting the torque threshold without changing any of the parts of the steering system, however, is to change the location of the adjustable abutment.

According to one embodiment, the brake mechanism comprises a first locking element, a second locking element, and an actuator, for engaging the first locking element with the second locking element in an engaged locking position. The actuator is preferably an electromechanical actuator.

According to one embodiment, at least one the first and second locking elements includes an annular interface, e.g. toothed sleeve, in contact with the other of the first and second locking elements, e.g. a toothed lock bolt, in the engaged position.

According to one aspect of the invention, the first and second locking elements are positively engaged with one another in the engaged position. In particular, at least one of the first and second locking elements may include an annular interface with a number of protrusions and/or recesses distributed over a circumference of the annular interface.

According to another aspect of the invention, the first and second locking elements are frictionally engaged with one another in the engaged position.

According to one embodiment, the override comprises a friction clutch including a first friction element non-rotatable relative to the steering shaft and a second friction element non-rotatable relative to an annular interface of an annular locking element of the brake mechanism. The steering system may further comprise a bearing between the annular locking element and the steering shaft.

According to another aspect of the invention, there is provided a steering system comprising a steering shaft, a brake mechanism movable between a released position and an engaged position for angularly locking the steering shaft in several locking positions, and an override to allow rotation of the steering shaft upon application of a non-destructive external torque to the steering shaft above a given threshold when the brake mechanism is in the engaged position.

According to another aspect of the invention, there is provided a method of controlling a vehicle steering system during a transition from an autonomous operation mode to a manual mode, wherein a steering shaft is locked at an actual position at the end of the autonomous operation mode and until a driver manually applies a torque above a given threshold on the steering wheel.

DESCRIPTION OF THE FIGURES

Other advantages and features of the invention will become more clearly apparent from the following description of specific embodiments of the invention given as non-restrictive examples only and represented in the accompanying drawings, in which.

Corresponding reference numerals refer to the same or corresponding parts in each of the figures.

DETAILED DESCRIPTION OF PREFERRED EMBODIMENTS

Figure 1:
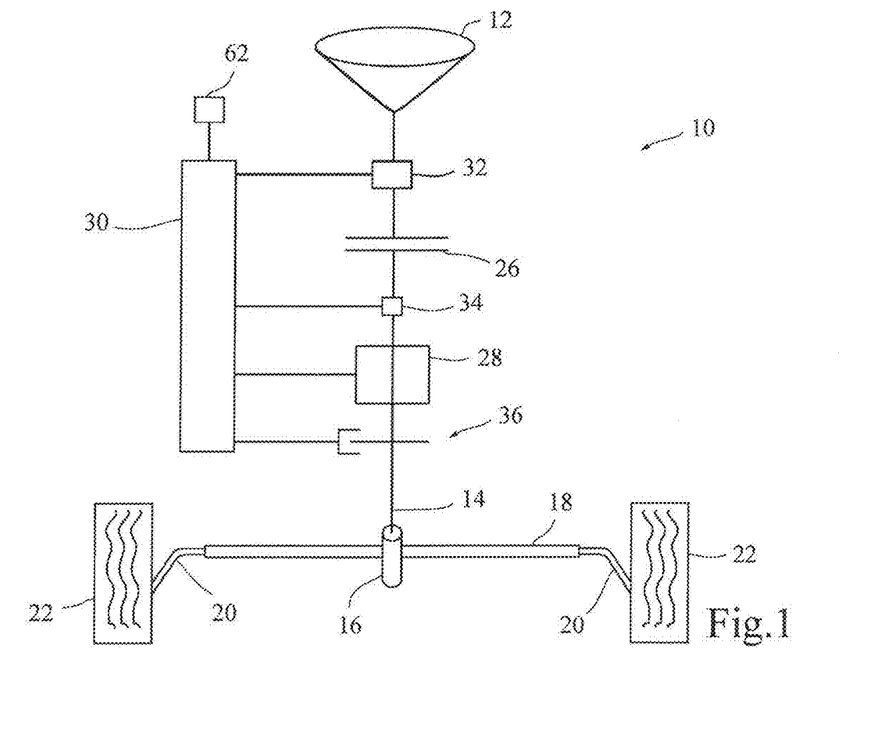
FIG. 1 illustrates a steering system according to one embodiment of the invention.
Figure 2:
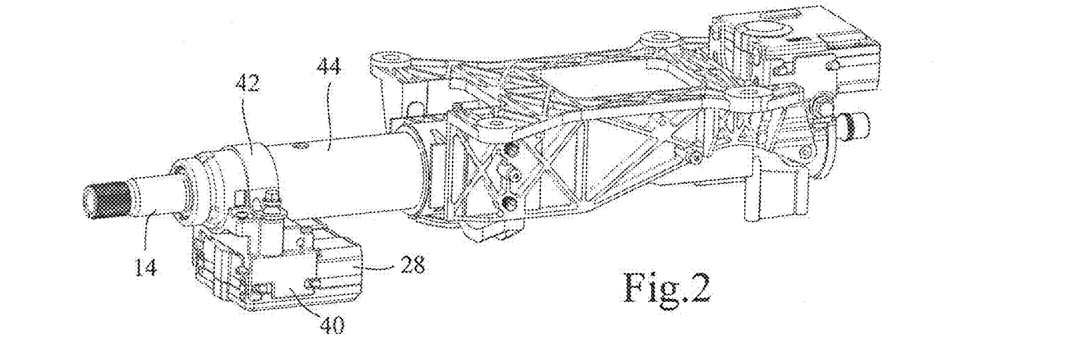
FIG. 2 is an isometric view of a steering column of the steering system of FIG. 1.
Figure 3:
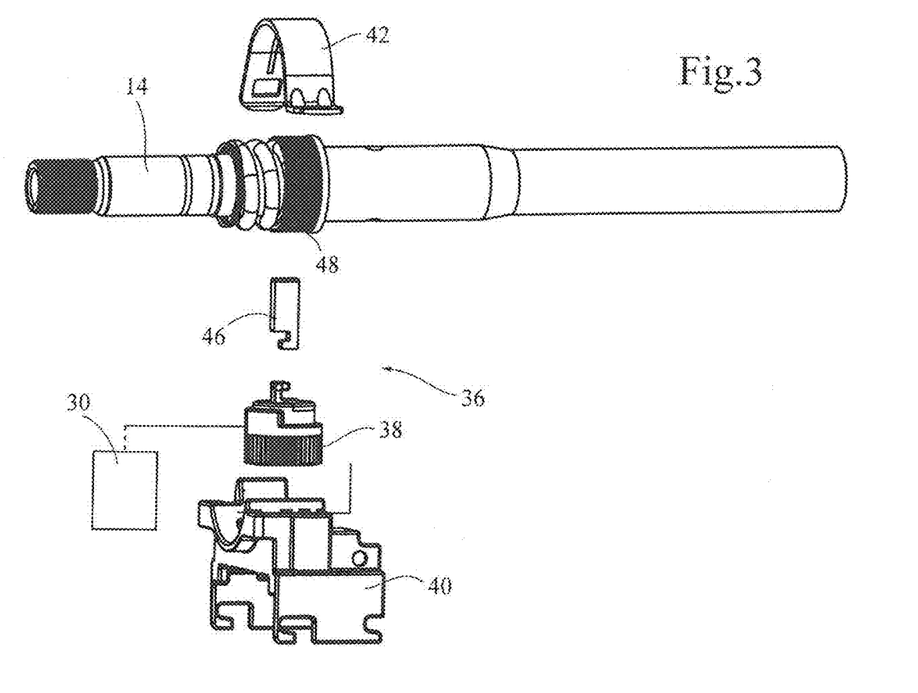
FIG. 3 is an exploded view of a part of the steering system of FIGS. 1 and 2, showing the assembly of a braking system on the steering column.
Figure 4:
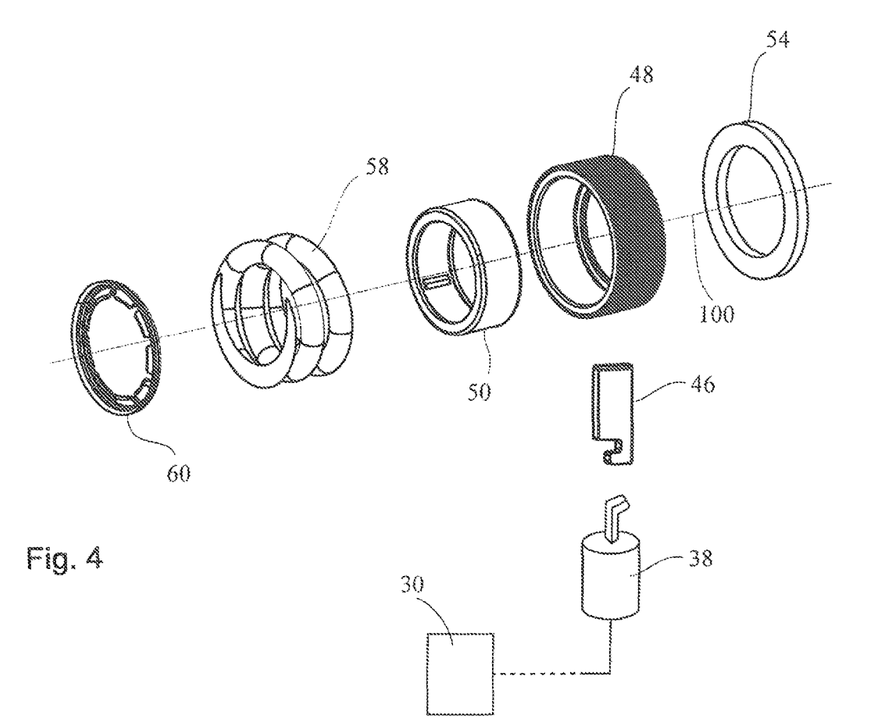
FIG. 4 is a more detailed exploded view of the braking system of FIG. 3.
Figure 5:
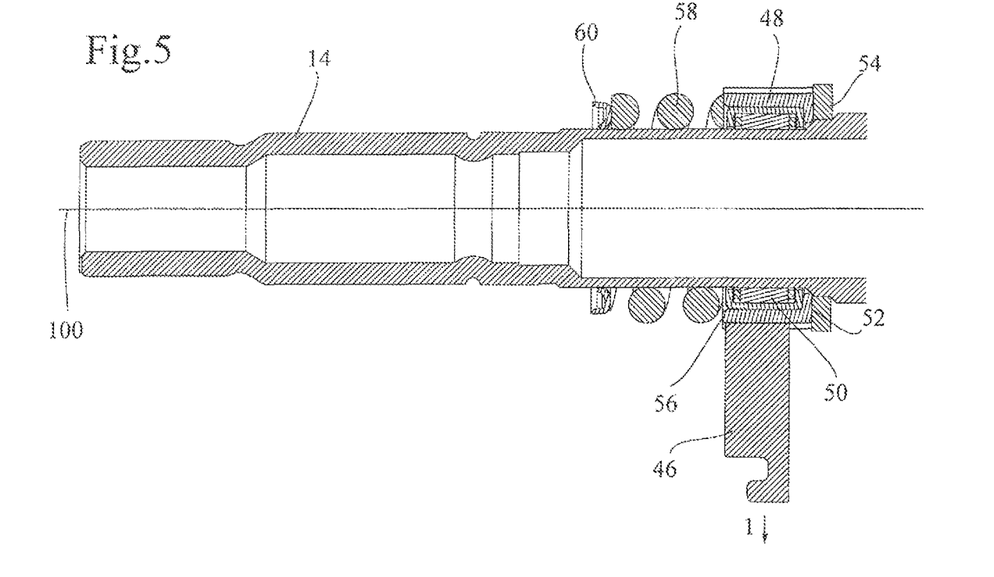
FIG. 5 is a section of a steering shaft and of the braking system of FIG. 3.

Referring to FIG. 1, a vehicle is provided with a steering system 10 including a steering wheel 12, a steering shaft 14, a pinion gear 16 that rotates with the steering shaft 14 and meshes with a toothed rack 18 for moving tie rods 20 linked to steerable ground wheels 22. The steering wheel 12 is connected to the steering shaft through a mechanical or electrical clutch mechanism 26. A steering motor 28 is connected with the steering shaft and controlled by a steering control unit 30. Rotation and/or torque sensors 32, 34 are provided on the steering wheel 12 and on the steering shaft 14 and connected to the control unit 30. As such, this steering system 10 is known from US 2013002416, which is incorporated herewith by reference.

The steering system 10 is further provided with a friction brake mechanism 36, which is illustrated in detail in FIGS. 2 to 5. The brake mechanism 36 comprises an actuator 38 received in an actuator housing 40 clamped with a C-shaped clamp 42 to a jacket tube 44 in which the steering shaft 14 is mounted for rotation about a steering axis 100. The actuator 38, which can be of any suitable construction, moves a toothed lock bolt (e.g., a second locking element) 46 back and forth against a toothed sleeve (e.g., a first locking element) 48 in a radial direction respective to the steering axis 100. A needle bearing 50 is provided to guide the toothed sleeve 48 in rotation about the steering axis 100. The toothed sleeve 48 is pressed fitted onto an outer race ring of the needle bearing. The toothed sleeve has a first annular planar face 52 in frictional contact with a flat abutment ring (e.g., a friction element) 54 press-fitted onto the steering shaft 14, and a second annular face 56 opposed to the first annular face 52. A compression spring 58 is loaded between the second annular face 56 and an adjustable thrust washer 60, which is connected to the steering shaft 14 by press-fitting at a proper distance from the abutment ring 54 to achieve a desired axial force through the compression spring 58 at the interface between the toothed sleeve 48 and the abutment ring 54. As will be apparent to those skilled in the art, the brake mechanism does not impart any axial thrust on the steering shaft, since both the adjustable thrust washer and the abutment ring sit on the steering shaft.

A switch 62 may be provided to allow the driver to switch between a driver-controlled steering mode and an autonomous steering mode. This switch 62 may be located on the dashboard or integrated to the steering wheel 12, e.g. as disclosed in US2013002416.

In the driver-controlled steering mode and in the autonomous steering mode, the brake mechanism is disengaged, i.e. the toothed lock bolt 46 is out of engagement with the toothed sleeve 48, which can rotate together with the abutment ring 54, the compression spring 58, the adjustable thrust washer 60 and the steering shaft 14 as one unit.

In the driver-controlled steering mode, the clutch 26 is engaged and the steering wheel 12 is mechanically connected to the steering shaft 14 and the ground wheels 22. The motor 28 may or may not be used as power assistance for supplementing the torque delivered by the driver on the steering wheel 12.

In the autonomous steering mode, the clutch 26 is disengaged and the motor 28 applies a driving torque to the steering shaft 14 irrespective of the position of the steering wheel 12. In the autonomous steering mode, the driver may regain at least partial control of the steering by turning the steering wheel 12 by a predetermined angle, which is detected by the sensor 32. A haptic feedback (e.g. click) may be provided to inform the driver that his or her request to regain partial or total control of the steering system 10 has been registered and executed. Various transition strategies can be configured in response to the input of the driver and of various other parameters of the vehicle: the clutch 26 may or may not remain disengaged, and if not, the motor 28 may or may not be used as power steering assistance.

If on the other hand the autonomous steering mode has to be interrupted as a matter of urgency at the initiative of the steering control unit 30, e.g. because of a malfunction of the motor 28 or of a sensor, before the driver has had time to regain control of the steering, the autonomous steering control unit generates an alarm to inform the driver and at the same time reengages the clutch 26 and the brake mechanism 36. The toothed lock bolt 46 engages the toothed sleeve 48 so as to prevent its rotation. The toothed sleeve 48 is biased by the loaded compression spring 58 in frictional engagement with the flat abutment ring 54 and prevents rotation of the steering shaft 14. As a result, the rack and pinion transmission 18, 16, tie rods 20 and ground wheels 22 remain in the position assumed at the beginning of the transition, to give the driver time to regain control of the steering wheel 12. As soon as the driver imparts torque to the steering wheel 12, the sensor 32 detects the applied torque and the control unit disengages the toothed lock bolt 46 to release the steering shaft 14. Should however the toothed lock bolt 46 remain engaged, e.g. because of a malfunction of the sensor 32, of the actuator 38 or of the control unit 30, the driver can override the brake mechanism 36 by applying a torque that is higher than the rated frictional torque resulting from the axial force of the compression spring 58 onto the toothed sleeve 48, to maneuver the vehicle to a full stop in a fail-safe mode. During this maneuver, the brake mechanism 36 remains engaged, which means that the driver has to continuously overcome the rated frictional torque of the brake mechanism. For this reason, the rated frictional torque of the brake mechanism should preferably be both of a sufficient magnitude to prevent rotation of the steering shaft before the driver has gripped the steering wheel, and sufficiently low to allow the driver to turn the steering wheel.

Figure 6:
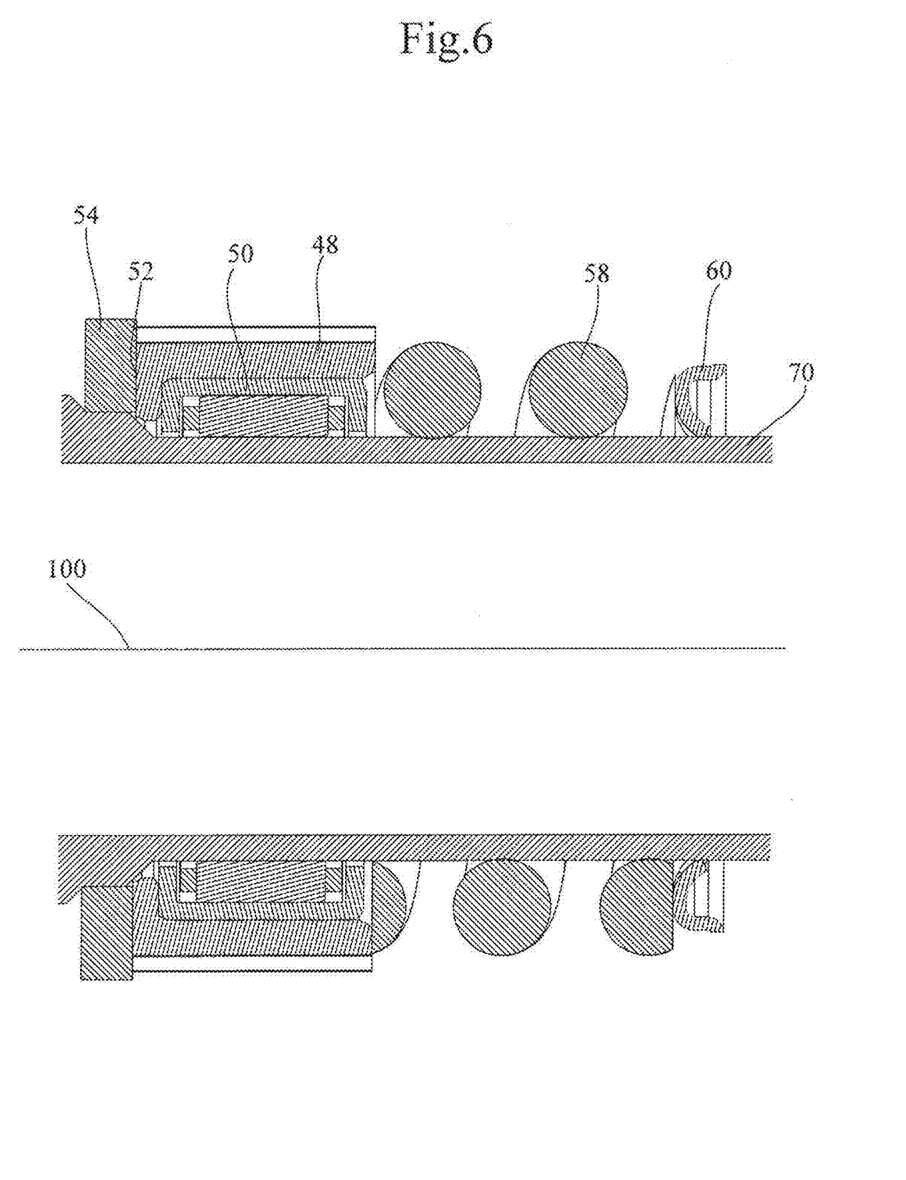
FIG. 6 is a section of an alternative embodiment of the braking system.

In the embodiment illustrated in FIG. 6, the brake mechanism 36 is mounted on a sleeve 70 to create a stand-alone module. The sleeve 70 can be press fitted or welded on the steering shaft 14.

Figure 7:
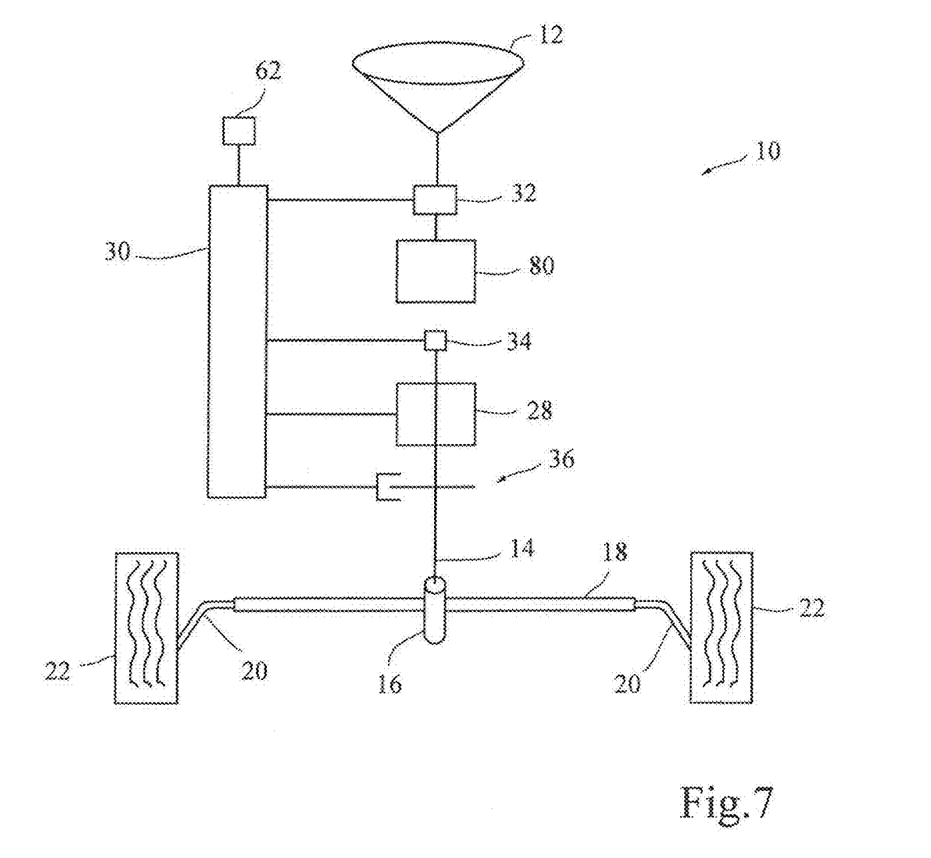
FIG. 7 illustrates an alternative embodiment of the steering system.

In the embodiment of FIG. 7, the brake mechanism 36 is inserted in a steering system 10 without a clutch, including a steering wheel 12, a steering shaft 14, a pinion gear 16 that rotates with the steering shaft 14 and meshes with a toothed rack 18 for moving tie rods 20 linked to steerable ground wheels 22. A steering motor 28 is connected with the steering shaft and controlled by a steering control unit 30. The steering wheel 12 is connected to a feedback motor 80. Rotation and/or torque sensors 32, 34 are provided on the steering wheel 12 and on the steering shaft 14 and connected to the control unit 30.

Various other modifications are contemplated. Depending on the packaging area available, the compression spring 58 can be replaced with a Belleville washer. The bearing 50 for guiding the toothed sleeve can be of any type, e.g. a roller bearing with or without cage, or a sliding bearing to achieve weight reduction or meet space requirements. Tuning can be achieved by proper selection of the materials and surface roughness or friction coefficient at the friction interface between the flat abutment ring 54 and the toothed sleeve 48. In particular, plastic, rubber, ceramic and/or organic resin can be used as well as steel. The adjustable thrust washer and/or abutment ring can be replaced with nuts if the shaft has provision for external threads. This allows a very precise tuning of the slipping torque.

The invention claimed is:

1. A steering system comprising a steering shaft and a brake mechanism movable between a released position and an engaged position for angularly locking the steering shaft, wherein the brake mechanism comprises an override such that a non-destructive external torque applied to the steering shaft above a given torque threshold when the brake mechanism is in the engaged position results in a rotation of the steering shaft, wherein the brake mechanism comprises:
a friction element non-rotatable relative to the steering shaft;
a first locking element provided with an annular friction face that faces the friction element;
at least one biasing spring for biasing the first locking element into frictional engagement with the friction element and for applying a predetermined biasing force to the first locking element in the engaged position, the predetermined biasing force being such that the first locking element starts slipping, relative to the friction element, upon application of the non-destructive external torque greater than the torque threshold; and
a second locking element and an actuator for operably engaging second locking element with the first locking element for angularly locking the first locking element in the engaged position.

2. The steering system of claim 1, further comprising an adjustable abutment for loading the biasing spring, the adjustable abutment being fixed at an adjustable position in relation to the steering shaft.

3. The steering system of claim 1, wherein the biasing spring is a helicoidal spring wound around the steering shaft.

4. The steering system of claim 1, wherein the torque threshold is more than 1 Nm and less than 13 Nm.

5. The steering system of claim 1, wherein the actuator is an electromechanical actuator.

6. The steering system of claim 1, wherein at least one of the first and second locking elements includes an annular interface in contact with the other of the first and second locking elements in the engaged position.

7. The steering system of claim 1, wherein the first and second locking elements are positively engaged with one another in the engaged position.

8. The steering system of claim 1, wherein at least one of the first and second locking elements includes an annular interface with a number of protrusions and/or recesses distributed over a circumference of the annular interface.

9. The steering system of claim 1, wherein the first and second locking elements are frictionally engaged with one another in the engaged position.

10. The steering system of claim 1, further comprising a bearing between the first locking element and the steering shaft.

11. A steering system comprising a steering shaft and a brake mechanism movable between a released position and an engaged position for angularly locking the steering shaft, wherein the brake mechanism comprises an override such that a non-destructive external torque applied to the steering shaft above a given torque threshold when the brake mechanism is in the engaged position results in a rotation of the steering shaft, wherein the brake mechanism comprises:
a friction element non-rotatable relative to the steering shaft;
a first locking element provided with an annular friction face that faces the friction element;
at least one biasing spring for biasing the first locking element into frictional engagement with the friction element and for applying a predetermined biasing force to the first locking element in the engaged position, the predetermined biasing force being such that the first locking element starts slipping relative to the friction element upon application of the non-destructive external torque greater than the torque threshold; and
a second locking element and an actuator for positively engaging the second locking element with the first locking element for angularly locking the first locking element in the engaged position.

12. A steering system comprising a steering shaft defining a steering axis, and a brake mechanism movable between a released position and an engaged position for angularly locking the steering shaft, wherein the brake mechanism comprises an override such that a non-destructive external torque applied to the steering shaft above a given torque threshold when the brake mechanism is in the engaged position results in a rotation of the steering shaft, wherein the brake mechanism comprises:

a friction element non-rotatable relative to the steering shaft;

a toothed sleeve rotatable relative to the steering shaft;

at least one biasing spring for axially biasing the toothed sleeve into frictional engagement with the friction element and for applying a predetermined biasing force to the toothed sleeve, the predetermined biasing force being such that the friction element and the toothed sleeve start slipping upon application of the non-destructive external torque greater than the torque threshold;

a locking element; and an actuator for operably engaging the locking element with the toothed sleeve for angularly locking the toothed sleeve in the engaged position.

* * * * *